United States Patent [19]

Meadus et al.

[11] 4,111,874
[45] Sep. 5, 1978

[54] TRANSPARENT PRESSURE-SENSITIVE COATINGS

[75] Inventors: Frederick W. Meadus; Bryan D. Sparks; Ira E. Puddington, all of Ottawa, Canada

[73] Assignee: Canadian Patents and Development Limited, Ottawa, Canada

[21] Appl. No.: 729,292

[22] Filed: Oct. 4, 1976

[51] Int. Cl.² .................. C08L 29/04; C08L 31/04; C08L 91/00

[52] U.S. Cl. .................. 260/23 R; 260/23 AC; 282/28 R; 428/323; 428/327

[58] Field of Search .......... 428/323, 327; 260/23 R, 260/23 EM, 23 AR; 282/28 R

[56] References Cited

U.S. PATENT DOCUMENTS

| | | | |
|---|---|---|---|
| 2,188,590 | 1/1940 | Bjorksten et al. | 282/28 R |
| 2,245,040 | 6/1941 | Marks | 260/23 EM |
| 3,016,308 | 1/1962 | Macaulay | 282/28 R |
| 3,255,132 | 6/1966 | Reinecke | 260/23 EM |
| 3,311,579 | 3/1967 | Donat | 260/23 EM |
| 3,344,100 | 9/1967 | Donat et al. | 260/23 EM |
| 3,955,025 | 5/1976 | Matsukawa et al. | 428/323 |
| 3,956,562 | 5/1976 | Shibata et al. | 428/323 |
| 3,967,034 | 6/1976 | Meadus et al. | 428/323 |

FOREIGN PATENT DOCUMENTS 627,609 9/1961 Canada.
922,999 4/1963 United Kingdom.

*Primary Examiner*—Ronald W. Griffin
*Attorney, Agent, or Firm*—Wenderoth, Lind & Ponack

[57] ABSTRACT

An aqueous coating composition giving a pressure-sensitive coating when applied to a substrate and method of preparation thereof. The composition is in the form of an aqueous gel consisting of fatty acid soap particles and a selected non-waxy binder. The soap-forming cations are selected from sodium, potassium, and ammonium and the non-waxy binder is of the type of, vinyl acetate polymers and copolymers, acrylic polymers and copolymers, and mixtures thereof. The coating is deposited in the form of transparent, crystalline particles.

12 Claims, No Drawings

TRANSPARENT PRESSURE-SENSITIVE COATINGS

BACKGROUND OF THE INVENTION

1. Field of the Invention

This invention is directed to aqueous coating compositions, methods of preparing these compositions and to the pressure-sensitive coatings obtained on application to a substrate with subsequent removal of water from the composition upon drying. The pressure-sensitive coatings have particular application for copying and recording purposes.

2. Description of the Prior Art

Pressure-sensitive materials containing microcapsules of liquid colouring materials, or reactants which on contact with surrounding material give a coloured reaction product, the rupture of the capsules creating contrast with the surrounding areas, are known. These encapsulated liquid materials are costly and require care in preparation and in handling.

Pressure-sensitive particles having a dark core and a frangible light-coloured pigment covering are also known. Under pressure the covering breaks and the dark interior becomes exposed. There are limitations in terms of pressure required and resolution and contrast obtained using such materials. Such particles, as disclosed in Canadian Pat. No. 627,609 to Schossberger et al, are limited to light-coloured pigments, for example titanium dioxide.

Other pressure-sensitive coating systems are disclosed by Dalton in his U.S. Pat. Ser. Nos. 3,125,458, 2,313,808 and 2,313,810. These systems relate to aqueous dispersions of milled soap particles and binding agents. The pressure-sensitive coatings are spread on a coloured backing substrate to give a normally opaque pressure-sensitive coating which becomes substantially transparent upon the application of pressure.

According to applicant's U.S. Pat. No. 3,967,034 and copending application Ser. No. 669,754, a pressure-sensitive and heat-sensitive coating was provided having a compactible open porous continuous matrix structure of contiguous fine, discreet, stable, light-scattering, meldable, organic plate-like particles of a solid organic material and fine light-scattering pores. Such particles were selected from fatty acids, fatty alcohols and mixtures thereof or lignin or metal soap particles. The applied coating had a smooth surface and adhered to paper or other suitable substrate materials. The coated material was handleable without marking or marring and showed clear characters when subjected to pressure. However, the composition of this system is produced by a method which necessitates careful control of preparation conditions such as temperature and concentration.

It is an object of the present invention to provide a pressure-sensitive composition which is comparatively easily manufactured and provides a coating which is handleable without marking or marring which is a distinct disadvantage of the Dalton-type systems.

It is a further object of the invention to provide a coating which is compatible with existing aqueous coating equipment.

Further objects and advantages of the invention will be set forth in part in the following specification and in part will be obvious therefrom without being specifically referred to, the same being realized and attained as pointed out in the claims hereof.

SUMMARY OF THE INVENTION

The pressure-sensitive coating composition of the present invention provides a smooth transparent coating when spread on a substrate. On the application of pressure with a stylus, or typewriter, etc., the coating undergoes a structural change to give an opaque appearance. This transformation is the reverse procedure to that disclosed in applicant's copending application Ser. No. 316,726(U.S. Pat. No. 3,967,034) and is attained by the provision of a composition which gives a smooth transparent crystalline mass when spread on a substrate, said transparent crystalline mass apparently splitting or breaking into striations upon the application of pressure. Such striations scatter light incident thereon to give the coating an opaque appearance.

In accordance with the present invention there is provided an aqueous gel composition which on drying on a substrate forms a pressure-sensitive transparent coating, of transparent crystalline particles, the composition comprising (a) a fatty acid soap, the fatty acid being saturated and having from 16 to 18 carbon atoms, and having a cation selected from the group consisting of sodium, potassium, and ammonium, the soap being in the form of fine transparent particles, (b) water, in an amount sufficient to dissolve said fatty acid soap, and (c) a non-waxy binder in an amount which preferably yields a substantially gel-like composition when added to the water and fatty acid soap, the non-waxy binder being selected from the group consisting of vinyl acetate polymers, acrylic polymers, and mixtures thereof. The term "polymers" is meant to include copolymers of vinyl acetate or acrylic monomers with other vinyl monomers.

The invention further provides a transparent pressure-sensitive coating or layer which comprises fine crystalline transparent particles of a fatty acid soap substantially evenly distributed through a non-waxy binder, the fatty acid being saturated and having from 16 to 18 carbon atoms and having a cation selected from the group consisting of sodium potassium and ammonium and a non-waxy binder selected from the group consisting of vinyl acetate polymers and copolymers, acrylic polymers and copolymers, and mixtures thereof, application of pressure to said coating causing a change in surface structure of said coating such that light incident on said surface is scattered thereby providing said surface with an opaque appearance.

DESCRIPTION OF THE INVENTION

The present invention is based on the unexpected discovery that some soaps which are water-soluble together with a suitable binder give a transparent coating which is pressure-sensitive. These coatings consist of a transparent crystalline mass which it would appear breaks up upon the application of pressure to form striations or particles and voids which cause light-scattering to give opacity. In order that the opaque surface is clearly visible, a dark substrate is preferably used to provide adequate contrast.

Sodium, potassium and ammonium stearates and palmitates appear to be most suitable since they are adequately soluble in hot water thus providing a solution to which a suitable binder may be added.

It is not necessary that the binder is water-soluble, the main requirement being that such binder form a transparent film after drying on a substrate.

The coating composition behaves like a gel which may be readily applied to a substrate by means of an air-knife or like means. The wet composition may then be dried by microwave treatment or by any manner of drying without significant application of heat.

The coating composition may be applied to a casting surface, for example Teflon (trade mark), and then stripped off to form a flexible film which can be rolled up. The film is strong enough for handling purposes and sections can be cut off or metered from the roll.

A water soluble dye, for example Remazol Brilliant Blue etc., may be added to the basic composition to give a contrasting light colour. This composition, which is transparent blue, is preferably coated onto a red substrate so that the two colours optically mix to give a purple colour.

Preferable binders are acrylic polymers such as Acrysol WS-50 which is a water-solubilized acrylic polymer and the trade mark for a Rohm and Haas product, and polyvinyl acetate emulsion such as National Starch's Emulsion 25-2842. Plasticized polyvinyl acetate emulsions gave slightly better results than non-plasticized emulsions. Acrylic acid and acrylic acid esters form very suitable polymeric binders. Copolymers containing vinyl acetate or acrylic monomers can be used provided they form a transparent film.

Generally, the pressure-sensitive coating composition is prepared by the addition of the soap to warm or hot water so that the soap is completely dissolved therein to give a gel. A binder is then mixed into the gel, the binder being chosen to give on drying a transparent composition. This gel may be allowed to cool before application to the substrate.

DESCRIPTION OF THE PREFERRED EMBODIMENTS

The fatty acid soap is preferably formed in situ in water by the addition of the fatty acid to water and heating until the former has melted. This mixture is then vigorously stirred and the fatty acid completely saponified by the slow addition of a base containing a cation selected from a group which will form a soluble soap. This base would preferably be chosen from sodium, potassium or ammonium hydroxide. Thereafter the selected binder (e.g. Rohm and Haas Acrysol WS-50 (38% solids) is then blended together with the gel of fatty acid soap in water to give a coating composition which may suitably be spread on a dark-coloured or temporary substrate using a knife-coater or other means.

Particular, preferred embodiments of the invention are given in the following examples:

EXAMPLE 1

40 g. of stearic acid were added to 200 ml. of heated water and 24 ml. of concentrated ammonium hydroxide were then added dropwise with stirring until a gel was formed.

50 g. of this gel were then blended with 37.5 ml. of Rohm and Haas Acrysol WS-50 (a water-solubilized acrylic polymer with a solid content of 38%) and the resulting composition was spread onto black paper using a knife-coater. On drying a coating of approximately 0.001 inches in thickness was obtained. This coating gave excellent reproductions when used as a second sheet in a typewriter. The addition of polyvinyl acetate (Bondfast) to this composition provides a coating with reduced contrast but improved definition.

EXAMPLE 2

Similar results were obtained as in Example 1 when a polyvinyl acetate emulsion (for example National Starch's Emulsions 25-2842) was substituted for the acrylic resin. Plasticized polyvinyl acetate emulsions gave slightly better results than non-plasticized emulsions. These emulsions have been stabilized with a variety of materials, including surfactants and hydroxyethyl cellulose.

The range of concentrations used in Examples 1 and 2 was one part of stearic acid, enough ammonium hydroxide to convert the stearic acid completely to ammonium stearate, 1.5 to 15 parts of water and 0.5 to 5 parts of polymer binder. These ammonium soap systems gave the best results.

EXAMPLE 3

10 g. of potassium stearate were dissolved in 50 ml. of hot water and 20 g. of this hot potassium stearate solution were then mixed with 15 g. of Bondfast adhesive. The gel thus obtained when spread on a substrate gave a transparent pressure-sensitive film with fair contrast on application of pressure.

EXAMPLE 4

30 g. of hot potassium stearate solution were mixed together by hand with 30 g. of Acrysol WS-50 (Rohm and Haas). The gel thus obtained when spread on a suitable substrate gave a transparent, pressure-sensitive film with improved contrast on application of pressure to that obtained in Example 3.

EXAMPLE 5

4 g. of potassium palmitate were dissolved in 15 ml. of heated water and 17 g. of Acrysol WS-50 (Rohm and Haas) were added. The composition thus obtained was allowed to cool before application to a substrate. The coating gave a transparent, pressure-sensitive film with about the same contrast on application of pressure as the coating of Example 3 but with inferior definition.

What we claim as our invention is:

1. An aqueous composition which on drying on a substrate forms a pressure-sensitive transparent coating, the composition comprising
   (a) a fatty acid soap, the fatty acid being saturated and having from 16 to 18 carbon atoms, and having a cation selected from the group consisting of sodium, potassium and ammonium, the soap being in the form of fine transparent particles,
   (b) water, in an amount sufficient to dissolve said fatty acid soap, and
   (c) a non-waxy binder selected from the group consisting of vinyl acetate polymers, acrylic polymers, and mixtures thereof.

2. A composition according to claim 1 wherein said fatty acid is stearic acid or palmitic acid.

3. The composition according to claim 1 wherein the fatty acid soap is ammonium stearate and the non-waxy binder comprises a water-solubilized acrylic polymer.

4. The composition according to claim 1 comprising 1 part by weight of ammonium stearate, based on the weight of stearic acid, 1.5 to 15 parts by weight of water and 0.5 to 5 parts by weight of non-waxy binder.

5. The composition according to claim 1 wherein the fatty acid soap is selected from the group consisting of potassium stearate and potassium palmitate, and the non-waxy binder is a water-solubilized acrylic polymer.

6. The composition according to claim 1 wherein the non-waxy binder is polyvinyl acetate.

7. The composition according to claim 1 wherein the non-waxy binder is selected from the group consisting of an acrylic acid polymer and an acrylic acid ester polymer.

8. The composition according to claim 1 comprising an ammonium fatty acid soap and a mixed binder of polyvinyl acetate and an acrylic polymer.

9. A transparent pressure-sensitive coating or layer which comprises fine transparent particles of a fatty acid soap substantially evenly distributed through a non-waxy binder, the fatty acid being saturated and having from 16 to 18 carbon atoms and having a cation selected from the group consisting of sodium, potassium and ammonium and said non-waxy binder being selected from the group consisting of vinyl acetate polymers, acrylic polymers and mixtures thereof, application of pressure to said coating causing a localized change in structure of said coating such that light incident on said surface is scattered thereby providing said surface with a contrasting opaque appearance in the pressed area.

10. The transparent pressure-sensitive coating according to claim 9 wherein application of pressure thereto causes said localized structure to form striations which scatter light thereby providing said surface with said opaque appearance in the pressed area.

11. The coating according to claim 9 wherein said fatty acid soap is selected from the group consisting of ammonium stearate, potassium stearate and potassium palmitate.

12. The coating according to claim 9 wherein the non-waxy binder is a water-solubilized acrylic polymer.

* * * * *